United States Patent [19]
Williams et al.

[11] 3,917,021
[45] Nov. 4, 1975

[54] CONTROL MECHANISM

[76] Inventors: Richard D. Williams, 31 Fourth Ave., Fairport, N.Y. 14450; Fred G. Michaels, 4 Saxony Road, Pittsford, N.Y. 14534

[22] Filed: Aug. 19, 1974

[21] Appl. No.: 498,754

Related U.S. Application Data

[62] Division of Ser. No. 325,325, Jan. 23, 1973, Pat. No. 3,844,180.

[52] U.S. Cl. ............... 180/114; 70/182; 70/245; 70/252; 70/255; 74/471 R; 74/475 SW; 180/82 A; 180/82 B; 180/103
[51] Int. Cl.² .................. B60R 25/02; B60R 25/08
[58] Field of Search ........ 180/114, 82 A, 82 B, 103; 70/245, 252, 255, 182; 74/471 R, 473 R, 473 SW, 477

[56] References Cited
UNITED STATES PATENTS

| | | | |
|---|---|---|---|
| 2,863,519 | 12/1958 | McNamara | 180/114 |
| 2,867,310 | 1/1959 | Martin | 180/82 B |
| 3,021,913 | 2/1962 | Ouimet | 180/114 |
| 3,119,477 | 1/1964 | Ryder | 180/82 B |
| 3,490,255 | 1/1970 | Wight | 70/252 |
| 3,688,861 | 9/1972 | Lipschultz | 180/114 |
| 3,703,092 | 11/1972 | Elliott | 180/114 X |
| 3,780,822 | 12/1973 | Frey | 180/114 |

*Primary Examiner*—David Schonberg
*Assistant Examiner*—John P. Silverstrim

[57] ABSTRACT

The control mechanism described herein includes an instrument panel-mounted shift control knob assembly which serves to selectively rotate a pulley and belt arrangement to thereby move a pivotally mounted bell-crank lever connected to the belt and to which a transmission shift control cable is operatively attached. Associated with the control knob assembly and with an adjacent lock mechanism is a series of linkage members which serve to concurrently lock the steering wheel and the parking brake in response to the positioning of an ignition key in the "Lock" position in the lock mechanism only after the control knob is manually placed in the "Park" position and the parking brake is manually applied.

5 Claims, 9 Drawing Figures

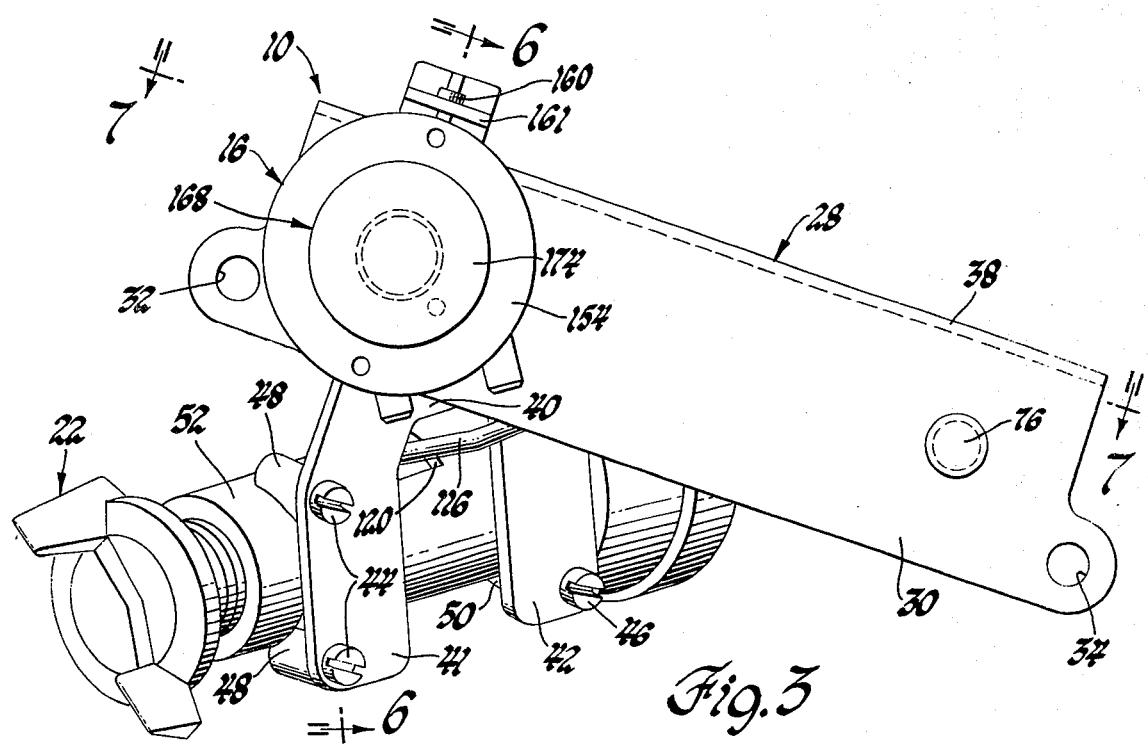
Fig. 3
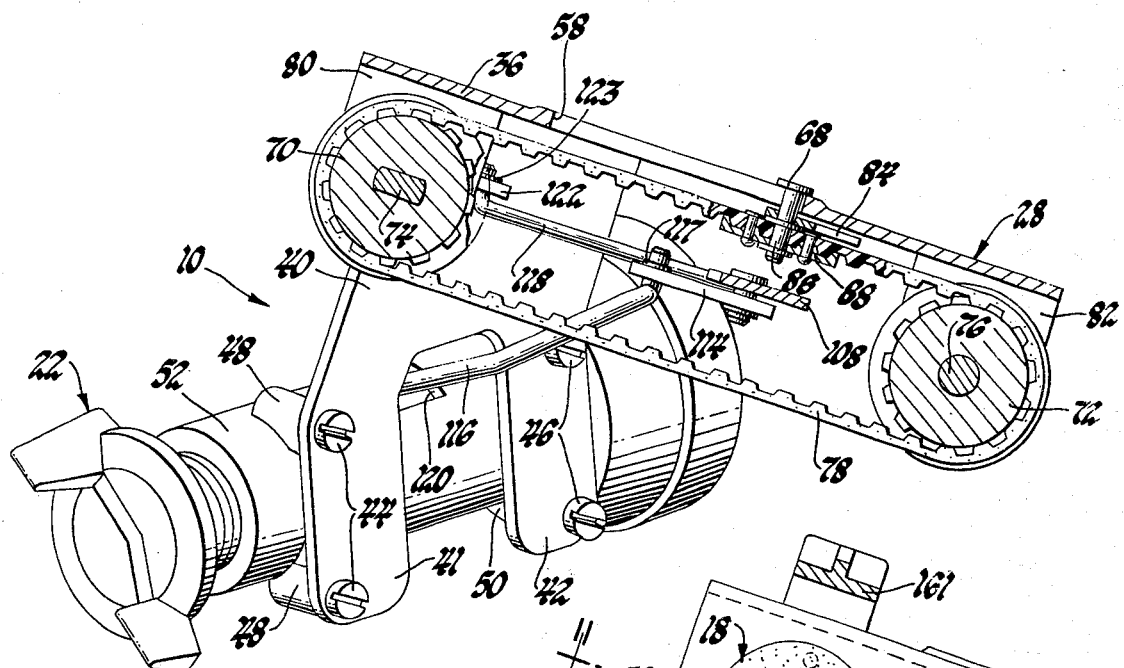
Fig. 4
Fig. 5

CONTROL MECHANISM

This is a Division of U.S. Pat. application Ser. No. 325,325, filed Jan. 23, 1973, now U.S. Pat. No. 3,844,180 dated Oct. 29, 1974.

This invention relates generally to automotive control mechanisms and, more particularly, to an instrument panel-mounted cable-actuating type.

An object of the invention is to provide an improved automotive instrument panel-mounted control mechanism suitable for performing a variety of functions.

Another object of the invention is to provide an instrument panel-mounted control mechanism having a rotary control knob assembly for actuating selected transmission drive ratios, and a cooperating lock and linkage mechanism for locking the steering wheel and parking brake and permitting ignition key removal when the control knob is in the "Park" position and the parking brake is manually applied.

A further object of the invention is to provide a control mechanism including a rotary control knob type transmission control arrangement for rotating a flexible belt and pulley and associated bellcrank lever assembly through six selected positions to produce five transmission drive ratios, namely, Reverse [R], Neutral [N], Drive [D], and two Low [S] and [L], via an interconnecting cable.

Still another object of the invention is to provide such a rotary control knob and pulley arrangement which is adaptable to having an additional linkage system operatively connected thereto for locking the steering wheel and parking brake automatically upon the manual positioning of an ignition key in the "Lock" position after the control knob has been manually rotated into the "Park" position and the parking brake has been manually applied.

A still further object of the invention is to provide an instrument panel-mounted control mechanism wherein a rotary control knob serves to rotate a toothed pulley and an associated toothed flexible belt, to thereby move a pivotally mounted bellcrank lever which is pivotally secured at one end thereof to the belt and to the other end of which a transmission control cable is pivotally attached, with the further provision of a lock mechanism and a first linkage member extending therefrom to a first pivotally mounted plate member which is both operatively connected to a second pivotally mounted plate via a second linkage member, and directly pivotally connected to cables leading to the steering wheel and the parking brake, there being an additional linkage member pivotally connected to the second plate member and operable to engage the toothed pulley to prevent rotation thereof once the rotary control knob is placed in the Park position and in response to rotating the ignition key in the Lock position in the lock mechanism.

These and other objects and advantages of the invention will be apparent when reference is made to the following description and accompanying drawings, wherein:

FIG. 3 is an end view taken along the plane of line 3—3 of FIG. 2, and looking in the direction of the arrows;

FIG. 4 is a cross-sectional view taken along the plane of line 4—4 of FIG. 2, and looking in the direction of the arrows;

FIG. 5 is a fragmentary cross-sectional view taken along the plane of line 5—5 of FIG. 2, and looking in the direction of the arrows;

Figure 1:
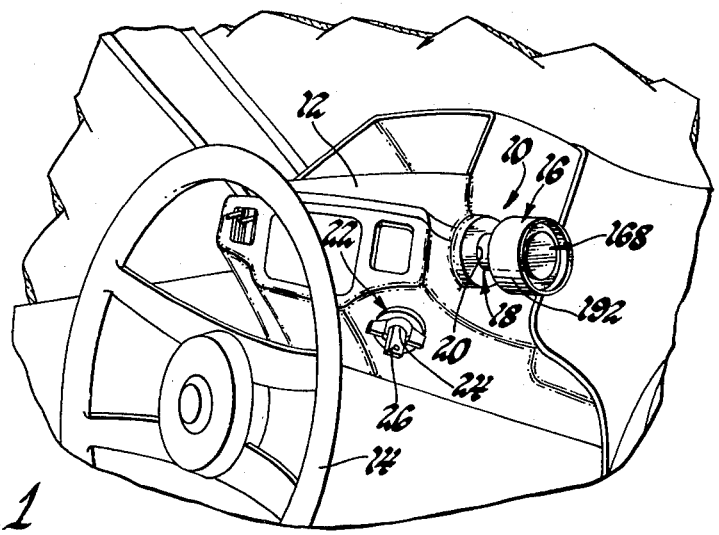
FIG. 1 is a perspective view of a vehicular instrument panel illustrating the inventive control mechanism mounted therein.

Referring now to the drawings in greater detail, FIG. 1 illustrates a control mechanism 10 mounted on an instrument panel 12 of an automotive vehicle, in the vicinity of the steering wheel 14. The control mechanism 10 includes a control knob assembly 16 rotatably mounted adjacent a starter switch 18 extending through an opening 20 formed in the instrument panel 12. A lock mechanism 22, including a key slot 24, is also mounted on the instrument panel 12, adjacent the control knob 16 but at a predetermined angle with respect thereto. A key 26 is insertable into the key slot 24.

Figure 2:
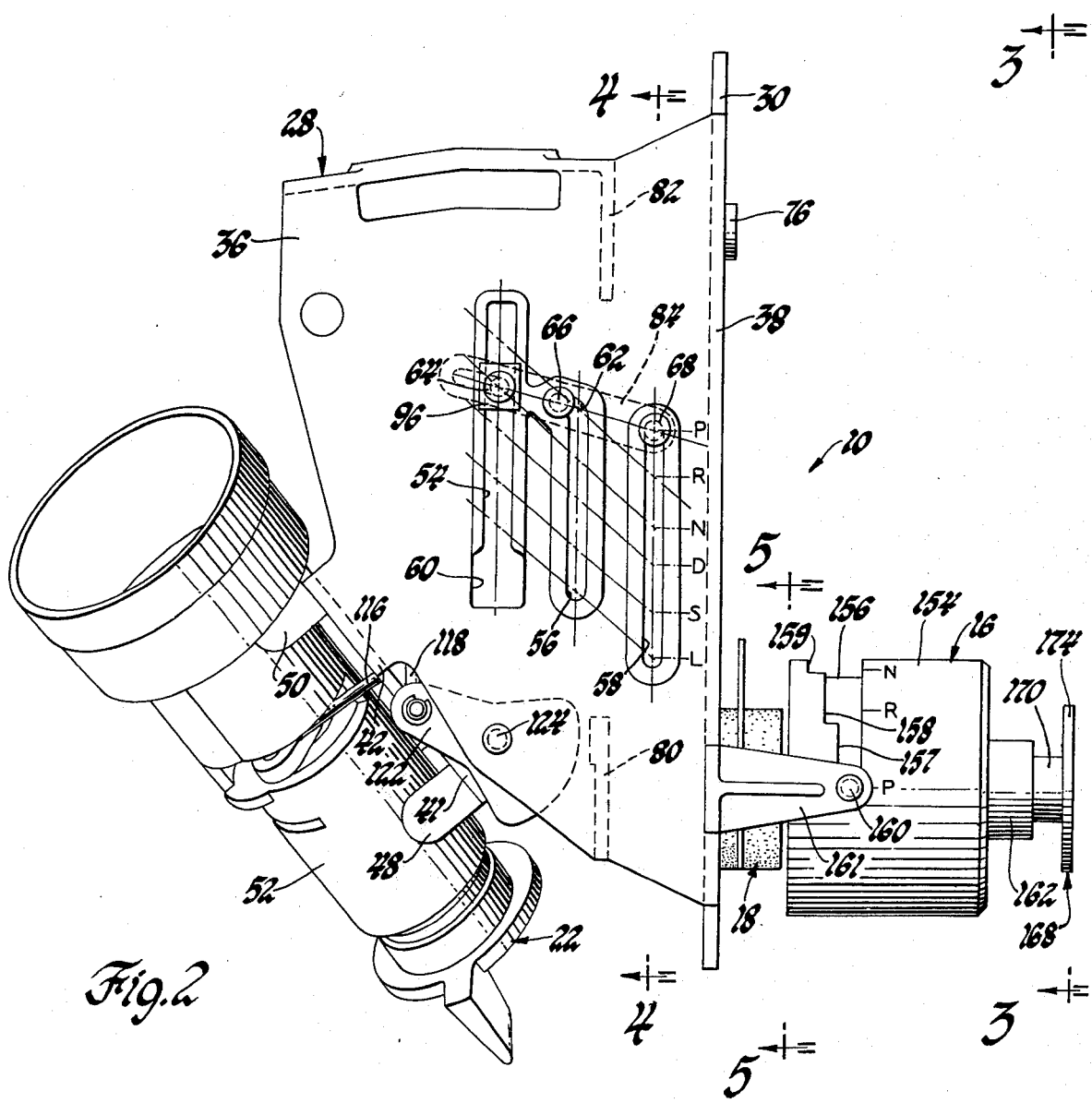
FIG. 2 is a top view of a control mechanism embodying the invention.

As may be noted in FIGS. 2 and 3, the control mechanism 10 and the lock mechanism 22 are rigidly secured with respect to one another by an interconnected bracket assembly 28. The assembly 28 includes a first flat plate member 30 (FIG. 3) whose plane is positioned perpendicular to the axis of the control knob 16 and which includes a pair of end openings 32 and 34 providing means for mounting the plate member 30 to the engine side of the instrument panel 12. A second flat plate member 36 (FIG. 2) is formed along an edge 38 of the first plate member 30, extending perpendicularly from the plane of the latter. A third flat plate member 40 including a pair of leg-like extensions 41 and 42 (FIG. 3) is formed along an edge of the plate member 36, perpendicular to the plane thereof, and serves as a base for the mounting thereon of the lock mechanism 22. This is accomplished by extending two pairs of bolts 44 and 46 through openings formed in the respective extensions 41 and 42 and, thence, threadedly attaching the bolts to two pairs of bosses 48 and 50 formed on the outer casing 52 of the lock mechanism 22.

As shown in FIG. 2, three parallel slots 54, 56, and 58 are formed in the plate member 36, the slot 54 having an enlarged opening 60 formed on one end thereof for assembly purposes, and the slot 56 having a short transverse or off-set slot 62 formed adjacent one end thereof opposite the opening 60. Three retainer flanges 64, 66, and 68, each larger in diameter than the width of the respective slots 54, 56, and 58, are slidably mounted on the plate member 36 adjacent such respective slots.

As may be noted in FIGS. 4, 6, 7, and 8, a pair of toothed pulleys 70 and 72 are rotatably mounted on respective shafts 74 and 76 extending through the plate member 30 and operatively interconnected by an endless toothed flexible belt 78. The pulleys 70 and 72 are axially retained adjacent the plate member 30 by respective wall members 80 and 82 formed on the plate member 36 and extending therefrom parallel to the plate member 30.

A linkage member or bellcrank lever 84 (FIG. 7) is pivotally connected at one end thereof by a pivot pin member 86 and suitable clamp 88 (FIG. 4) to the outer surface of the belt 78, with lost-motion means in the form of a slot 90 (FIG. 7) formed in the other end of the bellcrank lever 84. The pivot pin member 86 also extends through the slot 58, and it is the retainer flange 68 which retains the pivot pin member 86 for slidable movement in the slot 58. A second pivot pin member 92 (FIG. 7) is formed on and extends from the bellcrank lever 84 at an intermediate point therealong, the retainer flange 66 (FIG. 2) serving to retain the pivot pin member 92 for slidable movement in the interconnected slots 56 and 62 (FIG. 4). Still a third pivot pin member 94 (FIG. 7) extends through the slot 90 formed in the bellcrank lever 84, and, thence, through the slot 54 (FIG. 2) formed in the plate member 36. The pivot pin member 94 is retained for slidable movement in the slot 54 by the retainer flange 64 and a washer member 96, the latter being slidably mountable adjacent the slot 54 through the enlarged end opening 60 of the slot 54.

Adjacent the end of the pivot pin member 94 opposite the retainer flange 64 are formed a pair of spaced collars 98 (FIG. 8), between which is secured the end of a transmission cable 100 (FIG. 7), the latter cable 100 extending from the pivot pin member 94 through a sheave 102 secured by nuts 104 in an opening 105 formed in a wall member 106 formed along an edge of the plate member 36.

A support plate member 108 (FIGS. 7 and 8) extends parallel to the bellcrank lever 84 and includes a flange 110 (FIG. 8) secured to the bracket assembly plate member 30 by a bolt 111. A pivot pin 112 extends between the support plate member 108 and an adjacent parallel plate member 114 for pivotally supporting the latter. A pair of linkage rods 116 and 118 (FIG. 7) are pivotally mounted at predetermined points on the plate member 114 and secured thereon by retainer rings 117 (FIG. 7) and 119 (FIG. 8), respectively. The linkage rod 116 extends through the opening between the extensions 41 and 42 of the plate member 40 and through a slotted opening 120 formed in the outer casing 52 of the lock mechanism 22 to pivotally connect to a member 121 (FIG. 7) mounted therein and rotatably controlled by the key 26. As may be realized from FIG. 7, the member 121 is rotatable by the key 26 into four (4) positions, namely, Lock [L], Accessory [A], Off [O], and Run [R]. The key 26 is removable from the lock mechanism 22 only when the Lock [L] position.

The linkage rod 118 extends to still another plate member 122 and is pivotally secured thereon by a retainer ring 123. The plate member 122 is pivotally mounted on a centrally located pivot pin 124 secured to the plate member 36 (FIG. 2). An arcuate or curved cam slot 126 is formed in the plate member 122 on the side thereof opposite the linkage rod 118 connection, the pivot pin 124 being located in the center thereof. The cam slot 126 is positioned around a pin member 128 for slidable movement thereon. The pin member 128 includes a bent center portion 127 (FIG. 6) and is retained aligned with the pivot pin 124 by virtue of extending through an opening 129 (FIG. 7) formed in the fixed wall member 80. One end of the pin member 128 is thus retained in the slot 126 by a retainer clip 130, while the other end thereof is at times insertable into an opening 131 (FIG. 7) formed in the adjacent face 132 of the pulley 70, as will be explained.

Figure 6:
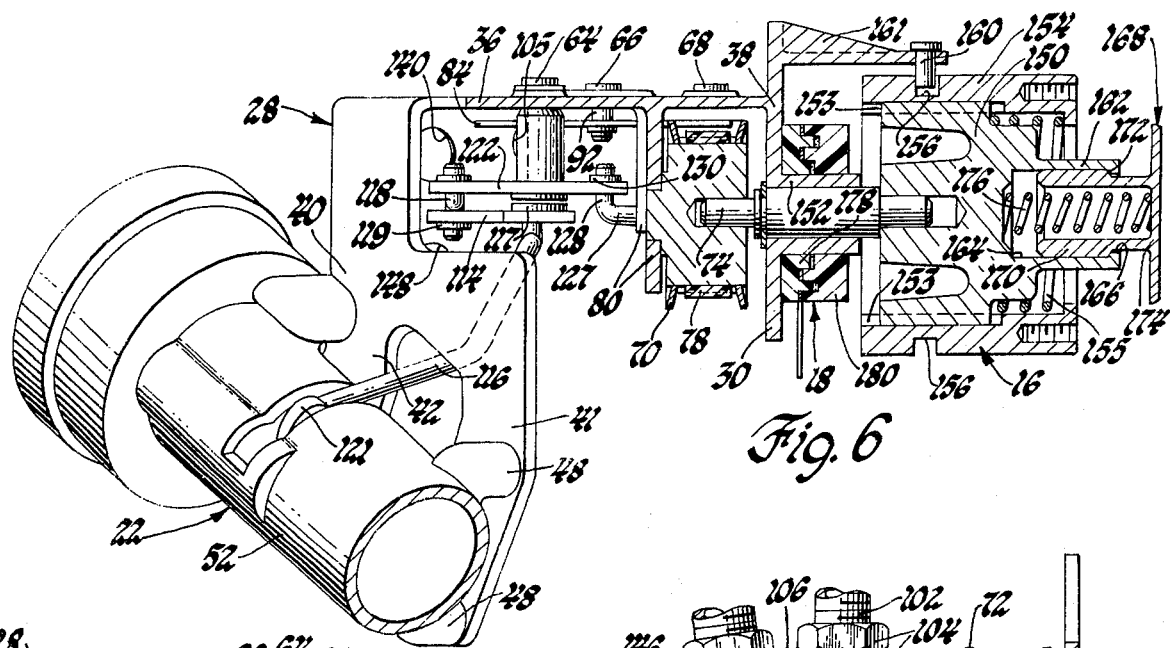
FIG. 6 is a cross-sectional view taken along the plane of line 6—6 of FIG. 3, and looking in the direction of the arrows.
Figure 8:
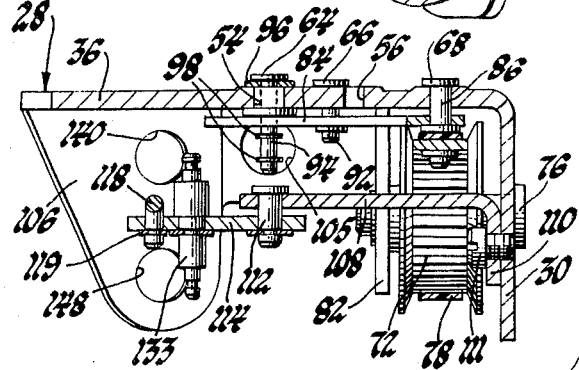
FIG. 8 is a cross-sectional view taken along the plane of line 8—8 of FIG. 7, and looking in the direction of the arrows.
Figure 7:
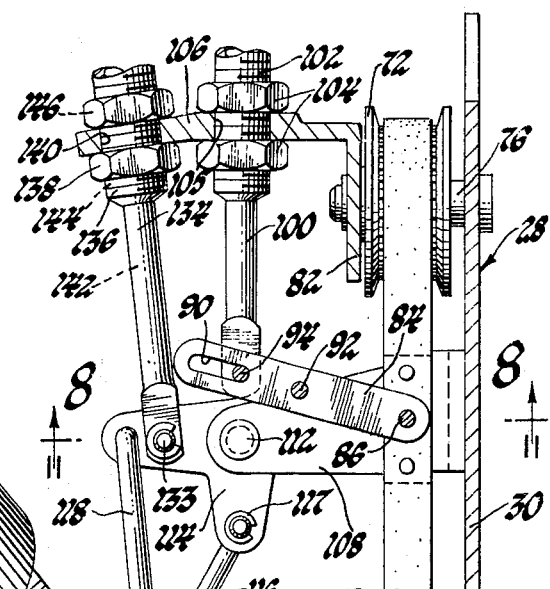
FIG. 7 is a cross-sectional view taken along the plane of line 7—7 of FIG. 3, and looking in the direction of the arrows.

Referring once again to the plate member 114 of FIGS. 6-8, it may be noted that a pin member 133 is mounted thereon and extends from both sides thereof (FIG. 8). A brake cable 134 (FIG. 7) extends from one end of the pin member 133 through a sheave 136 secured by nuts 138 in an opening 140 formed in the wall member 106, while a steering cable 142 (FIG. 7) extends from the other end of the pin member 133 through a second sheave 144 secured by nuts 146 in an opening 148 (FIG. 8) also formed in the wall member 106.

As may be noted in FIG. 6, the control knob 16 includes an inner cylindrical member 150 press-fitted on the shaft 74 on the end thereof opposite the toothed pulley 70, the shaft 74 being supported on the plate member 30 by virtue of extending through a cylindrical hub member 152 formed on the plate member 30. An outer casing 154 is axially slidably mounted on the inner cylindrical member 150 by means of intermeshed splines 153. A spring 155 is mounted between the inner member 150 and the outer casing 154, urging the casing 154 away from the inner member 150. An arcuate opening 156 (FIG. 2) is formed a predetermined distance around the outer casing 154, providing progressively stepped parallel side walls 157, 158, and 159 along one edge thereof. A pin member 160 is mounted on a bracket 161 which is formed on and extends from the interconnecting edge 38 between the plate members 30 and 36, the pin member 160 extendng into the arcuate opening 156 and being urged against the adjacent side wall 157, 158, or 159 by the spring 155.

A hub member 162 is formed on the outer end of the cylindrical member 150. A pocket 164 is formed on the hub member 162. An inwardly extending collar 166 is formed adjacent the end of the hub member 162. A starter button assembly 168 includes a sleeve member 170 mounted within the pocket 164 and having a circumferential shoulder 172 formed on the outer periphery thereof. A button 174 is formed on the exposed end of the sleeve member 170, and a spring 176 is mounted in the sleeve member 170 between the inner surface of the starter button 174 and the bottom of the pocket 164, urging the shoulder 172 into contact with the collar 166.

Figure 9:
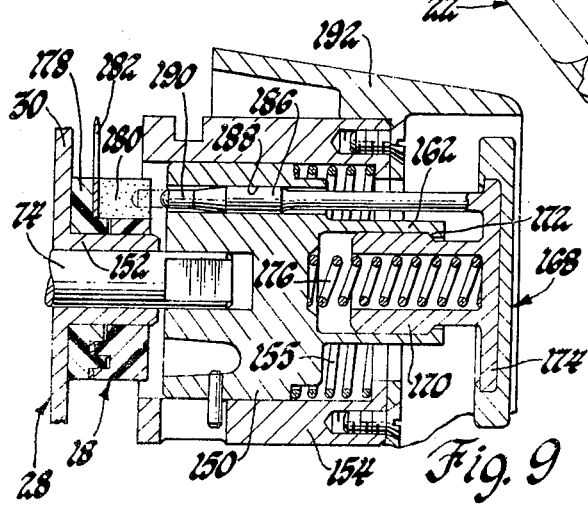
FIG. 9 is an enlarged cross-sectional view taken along the plane of line 9—9 of FIG. 5, and looking in the direction of the arrows.

As shown in FIG. 6, the starter switch 18 is mounted around the hub member 152 and includes two sets of contacts 178 and 180 (FIG. 5) positioned at predetermined locations thereon. A pair of terminals 182 and 184 extend outwardly from the starter switch 18. Referring now to FIG. 9, it may be noted that a rod-like member 186 is formed on the starter button 174, extending therefrom through a passage 188 formed through the inner cylindrical member 150. It may be further noted that, as the button 174 is depressed against the force of the spring 176, the end 190 of the member 186 may be projected into one of the sets of contacts 178 or 180, provided the latter is properly aligned therewith. The precise circumferential locations of the contacts 178 and 180 are such that the end 190 may enter respectively therein only when the control knob assembly 16 is positioned in the Neutral [N] or Park [P] position, respectively. Hence, start-up may occur only in the latter conditions.

As may be realized from FIG. 2, the conventional indicia P-R-N-D-S-L are formed on the outer casing 154 of the control knob 16, such indicia corresponding to five transmission drive ratio positions of the transmission cable 100 resulting from the movement of the pivot pin member 86 (FIG. 7) in the slot 58 (FIG. 2) formed in the plate member 36, the six drive ratios being well known as Park [P], Reverse [R], Neutral [N], Drive [D], and two Lows [S] and [L]. If desired, a housing member 192 (FIGS. 1 and 9) may be formed on the outer casing 154 to cover the starter button assembly 168.

In operation, from FIGS. 3, 4, 6, and 7, it is apparent that as the housing member 192 or the control knob outer casing 154 is manually rotated, the inner cylindrical member 150, the shaft 74, the pulley 70, and the flexible belt 78 are correspondingly rotated to thereby cause the bellcrank lever 84, through the pivot pin member 86, to slide the pivot pin 92 along the slot 56, thus sliding the pivot pin member 94 along the slot 54, initiating movement of the cable 100 leading to the transmission shift lever (not shown).

As may be noted from FIG. 2, the slots 56 and 54 formed in the plate member 36 appropriately position the respective pivot pin members 92 and 94, in response to the sliding movement of the pivot pin member 86 in the slot 58, so as to produce the desired transmission drive ratio through the transmission cable 100. By virtue of the off-set or short transverse opening 62 (FIG. 2) formed at the end of the slot 56, it may be noted from FIG. 2 that, as the pivot pin member 92 (FIG. 7) moves therein in response to the pivot pin member 86 being positioned in the Park [P] position in the slot 58, the retainer flange 64 and its associated pivot pin member 94 will seek the same point in the slot 54 for the Park [P] position of the retainer flange 68 and its associated pivot pin member 86 in the slot 58 as would result from positioning the pivot pin member 86 in the Neutral [N] position in the slot 58.

As may now be realized from FIGS. 6 and 7, rotation of the member 121 of the lock mechanism 22 via the key 26 (FIG. 1) produces a corresponding movement of the linkage rod 116 (FIG. 7) which, in turn, pivots the plate member 114 about the pivot pin 112. This correspondingly moves the linkage rod 118, causing the plate member 122 to pivot about the pivot pin 124 and forces the pin member 128 toward or away from the axis of the pivot pin 124, depending upon the positioning of the cam slot 126. It is only when the control knob casing 154 is rotated to Park [P] that the opening 131 is aligned with the adjacent end of the pin member 128. The shape of the cam slot 126 is such that the pin member 128 is caused to enter the opening 131 in its Park [P] location only when the key-controlled member 121 is rotated into the Lock [L] position (FIG. 7). The resultant movement of the linkage rod 116 and the plate member 114, when the lock mechanism member 121 is rotated into the lock [L] position, is such that the brake and steering cables 134 and 142, respectively, which are pivotally secured to the plate member 114 by the pin member 133 are caused to move to lock the steering wheel 14 and the parking brake (not shown). This, of course, as indicated above, would not occur unless the control knob assembly 16 is first rotated to the Park [P] position.

It should be apparent that the invention provides an improved, compact instrument panel-mounted control mechanism wherein manual rotation of a control knob serves, through an associated pulley and belt arrangement, to efficiently move a cable to selectively shift the transmission. It should also be apparent that the control mechanism further includes a lock mechanism and associated linkage means for actuating two additional cables and a linkage rod to respectively lock the steering wheel and parking brake and to permit key removal automatically, provided the control knob has first been rotated into the Park [P] position, and the parking brake is manually applied.

While but one embodiment of the invention has been shown and described, other modifications thereof are possible.

We claim:
1. A control mechanism comprising a transmission shift control assembly having a plurality of ratio control positions including Park, a lock mechanism adapted to having a key manually operable therewith; a device to be controlled; and a linkage system operatively connected among said lock mechanism, said device to be controlled, and said shift control assembly, said linkage system including first and second pivotally interconnected and pivotally mounted plate members, a first linkage member pivotally connected at one end thereof to said first pivotally mounted plate member and at the other end thereof to said lock mechanism, an actuator member pivotally mounted on said first pivotally mounted plate member for connection with said device to be controlled, locking means operatively connected between said second plate member and said transmission shift control assembly for enabling locking said device to be controlled via said actuator member in response to movement of said first pivotally mounted plate member by said first linkage member resulting from manual movement of said key into said Lock position in said lock mechanism, said locking means being adapted to locking said second plate member and said transmission shift control assembly and thus permitting said movement of said key into said Lock position only when said shift control assembly is in said Park position.

2. A control mechanism comprising a transmission shift control assembly having a plurality of ratio control positions including Park, a lock mechanism adapted to having a key manually operable therewith; a device to be controlled; and a linkage system operatively connected among said lock mechanism, said device to be controlled and said shift control assembly, said linkage system including a first pivotally mounted plate member, a first linkage member pivotally connected at one end thereof to said first pivotally mounted plate member and at the other end thereof to said lock mechanism, an actuator member pivotally mounted at one end thereof on said first pivotally mounted plate member and adapted for connection at the other end thereof with said device to be controlled, a second pivotally mounted plate member having cam means formed therein, a second linkage member pivotally connected between said first and second pivotally mounted plate members, locking means operatively connected between said cam means and said transmission shift control assembly and adapted to being locked by movement of said second pivotally mounted plate member resulting from respective movements of said second linkage member, said first pivotally mounted plate member, and said first linkage member, all in response to manual movement of said key into said Lock position in said lock mechanism only when said shift control assembly is in said Park position, thereby enabling the locking of said device to be controlled by said actuator member in response to said movements of said first pivotally mounted plate member and said first linkage member.

3. A control mechanism comprising a transmission shift control assembly having a plurality of ratio control positions including Park, a lock mecchanism adapted to having a key manually operable therewith; a device to be controlled; and a linkage system operatively connected among said lock mechanism, said device to be controlled, and said shift control assembly, said linkage system including a first pivotally mounted plate member, a first linkage member pivotally connected at one end thereof to said first pivotally mounted plate member and at the other end thereof to said lock mechanism, means formed on said first pivotally mounted plate member for pivotally mounting at least one actuator member thereon for connection with said device to be controlled, a second pivotally mounted plate member having a contoured slot formed therein, a second linkage member pivotally connected between said first and second pivotally mounted plate members, an opening having its location controlled by said shift control assembly, and a formed pin member having one end thereof slidably mounted in said contoured slot and the other end thereof at times positioned adjacent said opening for insertion into said opening by said second pivotally mounted plate member upon axial alignment of said opening and said other end of said formed pin member resulting from respective movements of said second pivotally mounted plate member, said second linkage member, said first pivotally mounted plate member, and said first linkage member, in response to manual movement of said key into said Lock position in said lock mechanism only when said shift control assembly is in said Park position for enabling the locking of said device to be controlled by said at least one actuator member.

4. A control mechanism comprising a transmission shift control assembly including a shift control knob having a plurality of ratio control positions including Park, a lock mechanism adapted to having a key manually operable therewith; a plurality of devices to be controlled; and a linkage system operatively connected among said lock mechanism, said plurality of devices to be controlled, and said shift control assembly, said linkage system including a first pivotally mounted plate member, a first linkage member pivotally connected at one end thereof to said first pivotally mounted plate member and at the other end thereof to said lock mechanism, means formed on said first pivotally mounted plate member for pivotally mounting a plurality of actuator members thereon for respective connection with said plurality of devices to be controlled, a second pivotally mounted plate member having a contoured slot formed therein, a second linkage member pivotally connected between said first and second pivotally mounted plate members, an opening having its location controlled by manual rotation of said shift control assembly, and a formed linkage member having one end thereof slidably mounted in said contoured and the other end thereof at times positioned adjacent said opening for insertion into said opening by said second pivotally mounted plate member upon axial alignment of said opening and said other end of said formed linkage member resulting from respective movements of said second pivotally mounted plate member, said second linkage member, said first pivotally mounted plate member, and said first linkage member, in response to manual movement of said key into said Lock position in said lock mechanism only when said control knob is in said Park position for enabling locking said plurality of devices to be controlled via said respective plurality of actuator members, each reflecting said movement of said first pivotally mounted plate member.

5. For use with an automotive steering wheel and parking brake, the control mechanism described in claim 4, wherein said actuator members consist of a first cable connected between said mounting means and said steering wheel, and a second cable connected between said mounting means and said parking brake, said first and second cables serving to lock said respective steering wheel and parking brake in response to said manual movement of said key into the Lock position in said lock mechanism only when said control knob is in said Park position and upon manual application of said parking brake.

* * * * *